US012594558B2

(12) United States Patent
Leong

(10) Patent No.: US 12,594,558 B2
(45) Date of Patent: Apr. 7, 2026

(54) AT-HOME KIT FOR PROSTATE CANCER SCREENING AND OTHER DISEASES

(71) Applicant: SUNNYBROOK RESEARCH INSTITUTE, Toronto (CA)

(72) Inventor: Hon S. Leong, Toronto (CA)

(73) Assignee: SUNNYBROOK RESEARCH INSTITUTE, Toronto (CA)

( * ) Notice: Subject to any disclaimer, the term of this patent is extended or adjusted under 35 U.S.C. 154(b) by 669 days.

(21) Appl. No.: 18/007,875

(22) PCT Filed: May 28, 2021

(86) PCT No.: PCT/CA2021/050734
§ 371 (c)(1),
(2) Date: Dec. 2, 2022

(87) PCT Pub. No.: WO2021/243444
PCT Pub. Date: Dec. 9, 2021

(65) Prior Publication Data

US 2023/0249187 A1 Aug. 10, 2023

Related U.S. Application Data

(60) Provisional application No. 63/033,422, filed on Jun. 2, 2020.

(51) Int. Cl.
*B01L 3/00* (2006.01)

(52) U.S. Cl.
CPC ......... *B01L 3/5029* (2013.01); *B01L 2200/16* (2013.01); *B01L 2200/185* (2013.01); *B01L 2300/021* (2013.01)

(58) Field of Classification Search
CPC ............... B01L 3/5029; B01L 2200/16; B01L 2200/185; B01L 2300/021
See application file for complete search history.

(56) References Cited

U.S. PATENT DOCUMENTS

2003/0113906 A1 6/2003 Sangha
2017/0350797 A1* 12/2017 Estep .................... B01L 3/5082
(Continued)

FOREIGN PATENT DOCUMENTS

CN 108350435 A 7/2018
EP 2737951 A1 6/2014
(Continued)

OTHER PUBLICATIONS

Heather Cunningham et al., "Effective Long-term Preservation of Biological Evidence", NCJRS, pp. 1-152, published on Jun. 30, 2014.
(Continued)

*Primary Examiner* — Jill A Warden
*Assistant Examiner* — Michael Stanley Gzybowski
(74) *Attorney, Agent, or Firm* — HILL & SCHUMACHER

(57) ABSTRACT

Thus, the present disclosure provides a kit for collection of biofluids and preservation of any DNA and/or RNA contained in said biofluid. The kit includes a wipe composed of fibers for absorbing a preselected biofluid, the wipe being impregnated with one or more skin-friendly chemicals for preservation of the biofluid absorbed into the wipe. The kit includes a rigid re-scalable tube configured to contain the impregnated wipe therein, a re-scalable bag for sealing the rigid re-sealable tube containing the impregnated wipe for transportation. The kit includes instructions on how to impregnate the wipe with the pre-selected biofluid and seal it in the re-sealable bag, and a return envelope configured to receive therein the re-scalable bag containing the impregnated wipe.

15 Claims, 9 Drawing Sheets

(56) References Cited

U.S. PATENT DOCUMENTS

| | | | | |
|---|---|---|---|---|
| 2018/0273914 | A1 | 9/2018 | Kvam et al. | |
| 2019/0110436 | A1* | 4/2019 | Gardner | A01K 11/003 |
| 2019/0144919 | A1 | 5/2019 | Jackson et al. | |
| 2019/0355441 | A1* | 11/2019 | Smith | G01N 1/02 |

FOREIGN PATENT DOCUMENTS

| | | | |
|---|---|---|---|
| WO | 0062023 | A1 | 10/2000 |
| WO | 2017161378 | A1 | 9/2017 |

OTHER PUBLICATIONS

Karl R. VanDerMeid et al., "A method to extract cytokines and matrix metalloproteinases from Schirmer strips and analyze using Luminex", Molecular Vision, vol. 17, pp. 1056-1063, published on Apr. 11, 2011.

Soledad Benlloch-Navarro et al., "Lipid peroxidation is increased in tears from the elderly", Experimental Eye Research, vol. 115, pp. 199-205, published on Jul. 29, 2013.

Jorgensen et al., "Regional differences in semen quality in Europe", Hum Reprod, vol. 16, No. 5, May 2001 (May 2001), pp. 1012-1019.

Jignal et al., "Forensic Conception: DNA Typing of FTA Spotted Samples". J App Biol Biotech, Jul. 2014 (Jul. 2014), vol. 2(04), pp. 021-029,.

International Search report for PCT/CA2021/050734 dated Sep. 20, 2021, 3 pages.

* cited by examiner

| | 0.5% SDS | 0.5% SDS + 5mM EDTA | Suboptimal RNA extraction | No Treatment |
|---|---|---|---|---|
| **28S** | -34.6±5.4% | 100% | -70.3±1.2% | -64.3±5.2% |
| **18S** | -38.4±0.9% | 100% | -67.9±0.5% | -31.1±3.0% |

Determination of optimal buffer conditions for RNA extraction from PCA3 cells applied to lens paper E6 cells were applied to autoclaved lens paper treated with the indicated agents. RNA was extracted using Trizol and ran on a denaturing RNA agarose gel. As control, 1E6 cells were spun down and lysed directly with Trizol. Gel stained with ethidium bromide.

AT-HOME KIT FOR PROSTATE CANCER SCREENING AND OTHER DISEASES

CROSS-REFERENCE TO RELATED APPLICATIONS

This application is a National Phase of PCT/CA2021/050734 filed on May 28, 2021, and published on Dec. 9, 2021 as WO 2021/243444, in English, which claims priority to U.S. Provisional Patent Application No. 63/033,422 filed on Jun. 2, 2020, all of which are incorporated herein by reference in their entireties.

FIELD

The present disclosure relates to a kit for screening of various diseases, and more particularly the present disclosure relates to an "At-Home" kit for collection and transportation of semen detection disease biomarkers present in semen, including prostate cancer.

BACKGROUND

Prostate cancer is the most commonly diagnosed cancer in men, with 1 in 6 men expected to be diagnosed with this cancer in their lifetime. Women do not have any glandular equivalent to the prostate. However, not all men will die from prostate cancer since the majority of newly diagnosed prostate cancer patients have low-risk and intermediate-risk forms. This is because opportunistic screening for prostate cancer has been in place for the last 30 years, leading to early stage migration (fewer late stage cases, mostly early stage cases being found at initial presentation). Opportunistic screening is a type of screening that is not considered medically mandatory by any health authority. It is considered optional for the patient after a discussion of the patient's situation with his family doctor or urologist. Hence it is the responsibility of the patient and not the province's/health authority's responsibility. Currently, the prostate specific antigen (PSA) blood test is used for opportunistic screening to identify men with prostate cancer.

In contrast, organized screening is medically mandatory/recommended and paid for by the majority of health authorities. Examples of tests for organized screening of a particular disease: Pap Smears for Cervical Cancer, Colonoscopies for Colon Cancer, and Mammograms for Breast Cancer; and testing for COVID for infectious diseases. Some of these are supported by strong Level 1 epidemiological evidence (Pap Smear, Colonoscopy), whereas some are medically mandatory due to pandemic measures or by strong patient advocacy groups (breast cancer patient/survivors). For screening of prostate cancer, only opportunistic screening guidelines are in place which are established by medical associations such as the American Urologic Association (AUA) and Canadian Urologic Association (CUA). Hence, screening of prostate cancer is considered to be optional because of the flawed effectiveness of the PSA test and its risks to male health.

Prostate Specific Antigen (PSA) and Clinical Workup of Prostate Cancer

PSA as per its name, is a secreted enzyme protein produced by the prostate gland and is a key constituent of semen. Semen is the fluid that is released during ejaculation and consists of two gland secretions: prostatic fluid (prostate) and seminal fluid (seminal vesicles). Typically, semen is 30% prostatic fluid and 70% seminal fluid. These two fluids remain separated and finally interact with each other after ejaculation when they become mixed, resulting in semen that initially "gels" and briefly becomes viscous and then becoming liquified. Each gland produces a specific set of proteins needed for sperm function. Prostatic fluid contains proteins such as PSA and can contain biomarkers secreted by prostate cancer cells or via exfoliation from the tumor into the duct where the prostatic fluid secretions accumulate prior to ejaculation. Seminal fluid contains various proteins such as Semenogelin that are needed to make the semen temporarily viscous. Conversely, prostatic fluid contains proteins and electrolytes/metabolites that cause the initial "gelling" of semen and then its subsequent liquefaction of semen. This initial "gelling" allows sperm to adhere to the uterus wall for a brief time. Within minutes, PSA will dissolve this gel in order to allow the sperm to migrate upwards to the fallopian tubes to find an egg. Hence, PSA is not a prostate cancer specific biomarker, it is only a biomarker specific for the prostate gland. Its detection in the blood of men only indicates that there is a problem with the prostate, and this could include an infection of the prostate, benign prostatic hyperplasia (BPH), trauma, or prostate cancer.

The PSA test was developed at Roswell Park Cancer Center (Buffalo, NY) and essentially measures the amount of PSA protein present in a patient's serum sample (upper fraction of clotted blood after centrifugation) using an ELISA assay. Antibodies for PSA are used in the ELISA assay which uses a colorimetric readout to quantitate levels of PSA in a patient's blood sample. Data is collected by a spectrophotometer and the data is captured and analyzed via computer. There are various antibodies that can be used in this assay to detect forms of PSA that are complexed with other proteins or not (free PSA, total PSA).

The performance test characteristics of PSA are highly documented with various levels in the blood known to accurately predict what percentage of patients will have prostate cancer or not. Currently, urologists use >4 ng/ml of PSA in serum (the supernatant of clotted blood after it has been centrifuged at >1,000×g's for >10 minutes at room temperature) as the cutoff for suspicion of prostate cancer in a person they are seeing for the first time. However, a PSA of 4 ng/ml and above only serves as a "red flag". It is not the main way a urologist forms a diagnosis of prostate cancer; it is just one of a series of first steps. The current gold standard for diagnosis of prostate cancer is the needle biopsy of the prostate. This is done after a clinical assessment of a patient's risk of cancer, which includes family history, PSA value (ng/ml), a digital rectal examination, age, and ethnicity. These clinical parameters all play an important role because the goal is to minimize the number of patients that receive a needle biopsy; it is a highly invasive procedure that has significant side effects because the needles must pierce through the rectum immediately next to the prostate in order to biopsy the prostate. After a prostate needle biopsy, a man may experience blood in his urine, semen, and some incontinence (decreased urinary function), and in some cases urosepsis which can lead to death due to fecal contamination in the blood caused by any one of the 12 needles used to obtain tissue. Hence, it is important for a urologist to recognize that a decision to request a needle biopsy can have significant harms on a patient and that extra consideration must be paid.

When a patient is about to undergo a prostate needle biopsy to confirm the presence of prostate cancer, there is still a 40-50% chance that he will actually not have cancer. This means that after a PSA test, a clinical assessment by a urologist, and the decision to have a needle biopsy, there is still a significant chance all these assessments were unnecessary. Moreover, those that are told they have cancer will be further confused: only half of those cases will require immediate therapy. This is because only a minority of patients will have high-risk prostate cancer, which is only diagnosed upon analysis of the tissue collected via prostate needle biopsy. In reality, the majority of newly diagnosed cancer cases are low-risk and intermediate risk. These risk categories are based on how the tumor appears histologically (under the microscope) and these are assigned a special scoring system known as the Gleason Group system. Low-risk prostate cancer is classified as GG1; Intermediate-risk prostate cancer is classified as GG2; and High-risk prostate cancer is classified as GG3, 4 and 5. We know that patients that have low-risk cancer (GG1) have a <1% chance of dying from their cancer. Patients that have intermediate-risk cancer (GG2) have a ~5-8% chance of dying from their cancer. Hence, there is general agreement that we should be not calling GG1 prostate cancer a "cancer" at all.

The clinical workup procedure of a prostate cancer patient from opportunistic screening to radical therapy (surgery, radiation therapy) has undergone significant evolution but two main things remain that require significant improvement: replacing the PSA blood test as an opportunistic screening tool and the accuracy of the needle biopsy.

Normally, semen is collected in a jar-like container and maintained in its fluid state until its arrival at a laboratory. This is because semen is typically analyzed for sperm counts which require the sperm to continue being motile and alive within a fluid until laboratory analysis. This also means that sending semen samples in a jar-like container through the mail is seldom done because of the length of time it would take for the specimen to arrive at the laboratory (overnight to 4 days if using normal mail) as well as the inconvenience of sending a plastic container in the mail. These limitations negatively influence the viability of the sperm for analysis.

Therefore, for semen analysis of RNA/DNA biomarkers and other protein/metabolite biomarkers of interest, it would be very advantageous to provide a different format that is compatible for analysis of biomarkers before they expire. A specific device design is needed in order to preserve and maintain integrity of these unstable biological entities (RNA/DNA/protein/metabolites/electrolytes) during transport to a laboratory for analysis.

SUMMARY

The present disclosure addresses the problems associated with current opportunistic screening tools/methods in two ways: 1) a significant improvement in the accuracy rate of detecting clinically relevant prostate cancer (GG2 and above) due to the analysis of semen for FDA already approved biomarkers for prostate cancer and, 2) a non-invasive, efficient, and convenient means of collecting a biofluid (semen) for detection of prostate cancer that preserves the milieu of biological entities that can be possibly used for analysis for diagnosis of prostate cancer, such as proteins, metabolites (catabolites, steroids, etc.), RNA, DNA, and cells.

The present disclosure provides an "At-Home" kit for screening of diseases, including but not limited to prostate cancer. The individual uses an autoclaved paper/napkin (tissue paper, filter paper, lens paper, cellulose/rayon hybrid fabric) that is impregnated with a 0.5% SDS+5 mM EDTA solution or any combination of RNAase/DNAse inhibitor, to collect and preserve the self-expressed or ejaculated semen. This wetnap/drynap or "Semen Wipe" after semen collection is placed into a transparent plastic bag (i.e., ziplock or something stronger) and then sent in the post to the service facility or core laboratory that will analyze various biomarkers in the semen. During collection post-ejaculation and transport, the semen will be absorbed and eventually will dry on the Semen Wipe. The RNAse/DNAse inhibitors prevent further degradation of the target RNA and DNA sequences, thus preserving these biomarkers for analysis at the core laboratory. This "pre-treated paper" or Semen Wipe is then placed into a vial containing solution for elution of cells that contain RNA/DNA as well as cell-free RNA/DNA present within the liquid phase of the semen. This elution fraction will also contain protein and metabolites from the patient's semen that can also be analyzed for cancer biomarkers. The elution fraction is then homogenized and submitted to RNA/DNA extraction with kits; the resulting purified RNA/DNA will then be used for biomarker analysis via molecular biology techniques and instrumentation. The biomarkers that may be used include, but are not limited to, PCA3 lncRNA, PSA mRNA (urine PCA3 test); BRCA2/1 DNA mutation analysis; serum T levels; and Y-chromosome arm deletions.

Thus, the present disclosure provides a kit for collection of biofluids and preservation of any DNA and/or RNA contained in said biofluid. The kit includes a wipe composed of fibers for absorbing a preselected biofluid, the wipe being impregnated with one or more skin-friendly chemicals for preservation of the biofluid absorbed into the wipe. The kit includes a rigid re-sealable tube configured to contain the impregnated wipe therein, a re-sealable bag for sealing the rigid re-sealable tube containing the impregnated wipe for transportation. The kit includes instructions on how to impregnate the wipe with the pre-selected biofluid and seal it in the re-sealable bag, and a return envelope configured to receive therein the re-sealable bag containing the impregnated wipe.

The one or more skin-friendly chemicals may include compounds which act as a general nuclease inhibitor.

The general nuclease inhibitor may include any one or combination of RNAase and DNAse inhibitors. The general nuclease inhibitor may include any one or combination of sodium dodecyl sulfate (SDS) polyvinylsulfonic acid, and diethyl pyrocarbonate. The sodium dodecyl sulfate (SDS) may be present in a range from about 0.01% SDS v/v to about 5% SDS v/v.

The sodium dodecyl sulfate (SDS) may be present in a concentration of about 0.5% v/v.

The one or more skin-friendly chemicals may further include EDTA solution for inhibiting RNAse/DNAse activity and induce RNA/DNA binding to the fibers of the wipe.

The EDTA solution may comprise about 1 to about 5 mM EDTA solution.

The one or more skin-friendly chemicals may further include a compound selected to preserve protein biomarkers and prevent growth of bacteria and mold.

This compound may be sodium azide in a solution. The sodium azide may be present in the solution in a range from about 0.01% to about 0.2%.

The kit according to claim 10, wherein the sodium azide is present in the solution in a concentration of <0.2%.

The wipe containing fibers may be any one of fiber containing paper and fiber containing fabric.

The wipe may include a slit along one edge of the wipe sized to be trapped between a lid on a DNA/RNA tube and the tube itself during a DNA/RNA extraction procedure so the wipe is draped over the lip of the tube and hangs down into the interior of the tube with a bottom edge of the wipe spaced from the bottom of the tube.

The wipe may include a machine readable code sticker attached thereto for linking the wipe with the patient being screened/tested and to protect patient privacy during the mailing and analysis process.

The kit may further comprise a down-loadable smartphone app configured and programmed to scan the machine readable code sticker to electronically link the patient's wipe to their chart/profile, said smartphone app being configured and programmed to electronically send results of scanning the machine readable code sticker to the laboratory tasked with analyzing the wipe, and wherein the smartphone app is configured and programmed to receive electronically transmitted information from the laboratory to appraise the patient of receipt by the laboratory of the wipe.

The biofluid to be collected may be semen.

A further understanding of the functional and advantageous aspects of the invention can be realized by reference to the following detailed description and drawings.

BRIEF DESCRIPTION OF THE DRAWINGS

Preferred embodiments of the invention will now be described, by way of example only, with reference to the drawings, in which.

DETAILED DESCRIPTION

Figure 1:
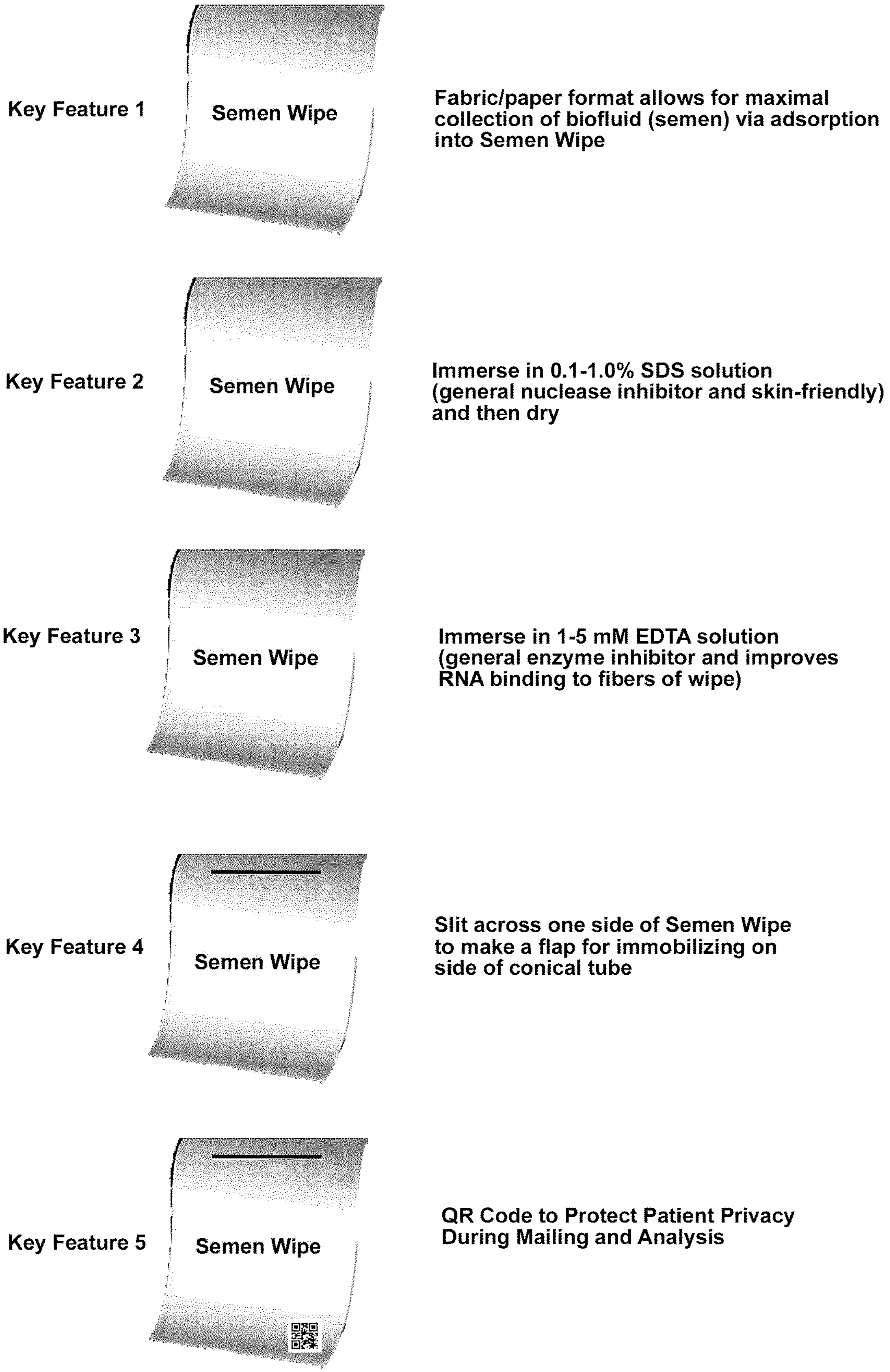
FIG. 1 shows pictorially five features of the Semen Wipe produced in accordance with the present disclosure.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some of the Figures may not be to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

At-Home Kit for Prostate Cancer Screening

Disclosed herein is an "At-Home Kit" in which a male provides a sample of semen that is sent in a regular envelope via mail to the laboratory for analysis.

We define the "At-Home Kit" as disclosed herein a collection of materials that is comprised of a: 1) Semen Wipe, 2) plastic re-sealable Ziploc bag, 3) paper instructions, 4) return envelope. We define the "Semen Wipe" as a piece of paper/fabric that has been impregnated with various skin-friendly chemicals that will maximize preservation of any semen that is collected onto the paper/fabric. It has various other design features that will be described below (FIG. 1).

The semen sample is collected onto a specialized piece of paper (tissue/lens paper) that contains a trace amount of a non-toxic chemical that will prevent DNA and RNA degradation. In one embodiment this chemical may be a solution of 0.5% Sodium Dodecyl Sulfate (SDS) however it will be appreciated that the range may vary from about 0.01% SDS v/v to about 5% SDS v/v, since anything higher than this upper limit will exceed the allowable maximum concentration for SDS for human exposure. It will also be appreciated that in addition to SDS, any other chemical able to inhibit RNases and DNAses present in semen or in the air may be used such as EDTA which can inhibit the activity or RNases and DNAses by chelating various divalent cations ($Mg^{2+}$, $Ca^{2+}$, $Zn^{2+}$) essential for enzyme function. However, there is one major requirement for this chemical: it must be non-toxic or non-irritating to human skin since this tissue/lens paper will be in contact with the patient's skin during semen collection. Alternative chemicals which may be used to inhibit RNases and DNAses present in semen or in the air or on skin include, but are not limited to, polyvinylsulfonic acid, and diethyl pyrocarbonate to mention a few non-limiting examples.

Referring to FIG. 1, several key features of the semen wipe shown generally at 10 disclosed herein are shown. In an embodiment the semen wipe 10 may be lens paper (4"×6" and can be smaller or larger) that possess five (5) key features. It will be appreciated that the semen wipe is not restricted to being made from lens paper, or other forms of tissue paper, or other fabric/paper hybrid membranes. For example, other non-limiting examples of semen wipes include, but are not limited to, fabrics and materials which are a paper-fiber cloth mixture. The fundamental properties required in the wipe are as follows: 1) it is in a fabric/paper form that can act as a wipe for absorbing any liquid material from a surface, such as semen; 2) it is impregnated with a chemical reagent (such as about 0.1 to about 5.0% v/v SDS) which will inactivate all RNAses and DNAses present in the semen/biofluid being adsorbed onto the wipe; 3) it is impregnated with a chemical reagent (such as about 1 to about 5 mM EDTA solution) which will inhibit RNAse/DNAse activity and optimize RNA/DNA binding to the fibers of the wipe; 4) has a small incision/cut/slit across one side which acts as a flap for immobilizing the semen wipe to the side of the conical tube during RNA extraction from the semen wipe; 5) has a QR code sticker attached to the corner of the semen wipe for tracking and identification purposes during the testing process.

The first key feature illustrated in the top most panel in FIG. 1 is that the collection device is a piece of lens paper or any fabric that allows for adsorption by the user off any surface (skin, toilet, floor, bedsheet, etc.) in a straightforward easy to use manner by a person's hand. This format allows for immediate drying of the biofluid (semen) due to adsorption by dry parts of the wipe. The second key feature illustrated in the next panel below in FIG. 1 is that the wipe is treated with SDS (<5.0%) or any other skin-friendly non-toxic chemical that acts as a general nuclease inhibitor. It may also optionally contain a small amount of Sodium Azide (<0.2%) (but may be in the range from about 0.01% to about 0.2%) to preserve protein biomarkers and prevent growth of bacteria, mold and the like. Once it is treated with SDS, the wipe 10 is dried and then packaged into the "At-Home Kit" and then obtained by the patient for semen collection.

A third key feature is that the wipe is subjected to tribroelectrification upon which it will become positively charged. This will enhance the ability of the fibers of wipe 10 to retain RNA and increase its RNA binding abilities it in order to protect it. A chemical known as Ethylenediaminetetraacetic Acid (EDTA) (from about 1 to about 10 mM) can be used to achieve this in one embodiment. In alternative embodiments other chemicals such as polyethylenimine can also achieve this. These chemicals also bind to any free divalent ions ($Ca^{2+}$, $Mg^{2+}$, $Zn^{2+}$, etc.) that are needed by enzymes such as RNases to be active. Other chemicals that can be used for this purpose are succimer, dimercaprol, deferoxamine, and penicillamine.

The fourth key feature is that the semen wipe 10 is provided with a slit 12 that provides a flap 14 at one end of the wipe that will allow the user to anchor the used semen wipe to the inner side of a conical tube in order to keep the used semen wipe separated from the eluted fraction that contains the biomarkers of interest (seen in FIG. 2 discussed below). This is effective during centrifugation of the entire unit such that at high centrifugation speeds, the Semen Wipe will remain anchored to one side of the conical tube while the eluted fraction will be concentrated at the bottom of the tube. This will allow the user to collect the majority of the liquid for use in downstream steps.

The fifth key feature is wipe 10 is provided with a bar code 16 (or QR code or other similar code) in order link the wipe with the patient being screened/tested and to protect patient privacy during the mailing and analysis process.

Figure 2:
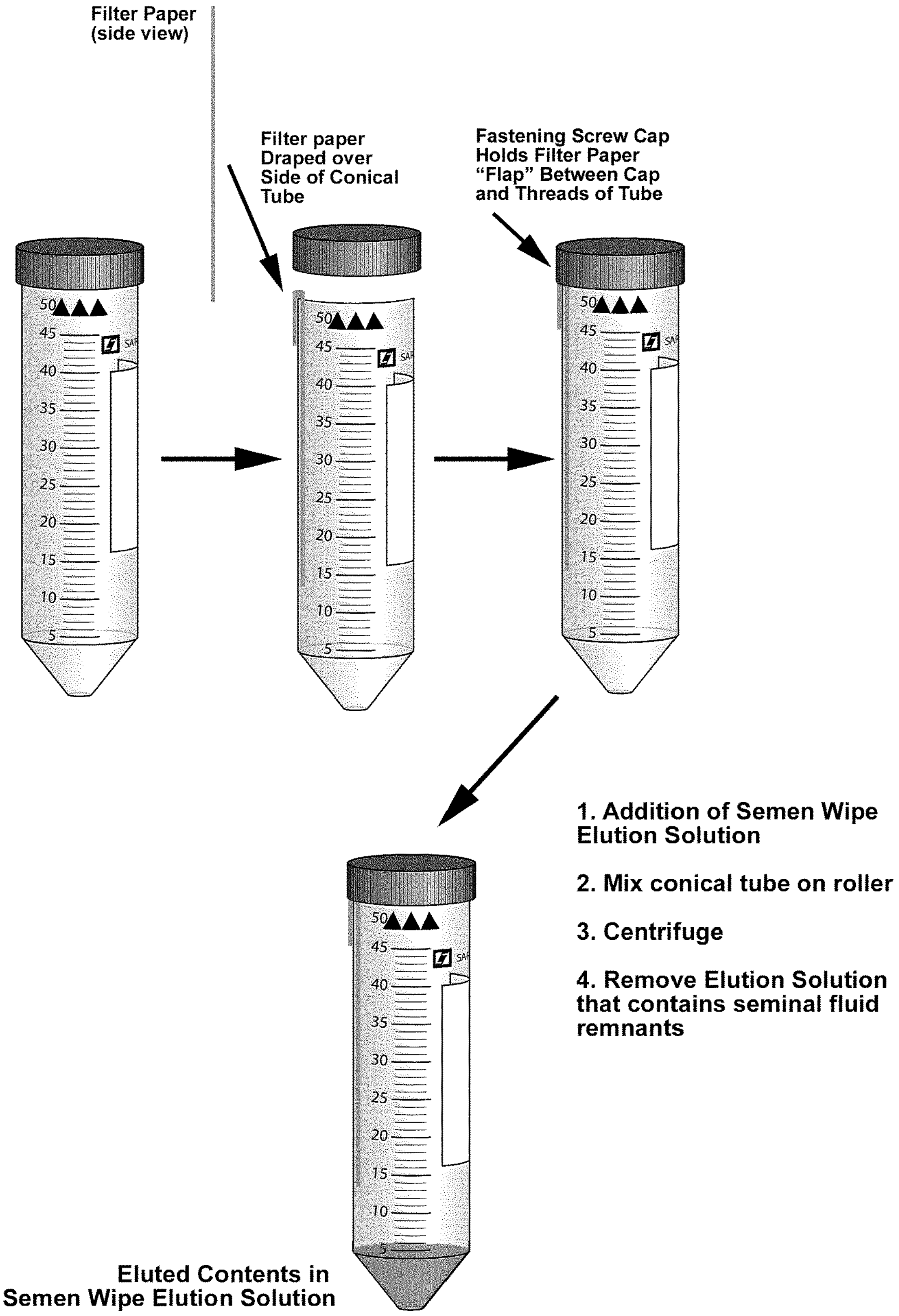
FIG. 2 shows pictorially the process of anchoring the used Semen Wipe to a conical tube once the semen has been collected in the wipe and the patient has mailed the dried semen wipe to the laboratory.

FIG. 2 shows the process of anchoring the used Semen Wipe 10 to a conical tube 20 once the dried wipe has been received at the laboratory for analysis. The flap 14 design feature enables the user to mix the elution solution with the used semen wipe and to consequently separate the used semen wipe from its extracted biological contents (RNA/DNA/protein/metabolites present in semen) that become solubilized/liberated and present in the Elution Solution. The flap 14 created by the slit 12 cut shown in FIG. 1 will allow the user to drape the drape portion of the lens paper over the side of the conical shaped storage tube 20 as shown in the middle of the upper middle panel showing the lid 22 separated from the rest of the tube 20. When a screw cap or lid 22 is used, the lens paper flap 14 will become fastened between the threads of the conical tube 29 and the cap 22. This will anchor the used semen wipe 10 onto the inside wall of the conical storage tube 20. After the addition of the elution solution, the cap 22 will be placed and then the contents of the tube 20 contents will be mixed using a tube revolver/rotator. After mixing, the entire sealed conical tube 20 will be centrifuged, resulting in a separation of the used semen wipe (inside wall of tube) and the elution solution 26 located at the bottom of tube 20. The elution solution which contains the biological contents of the semen will be transferred to another tube for further processing and analysis for biomarkers via qPCR or ELISA. This configuration and setup enables processing of a Semen Wipe with minimal handling or cap opening in order to prevent any fumes from Trizol or phenol to be released during sample extraction.

Figure 3:
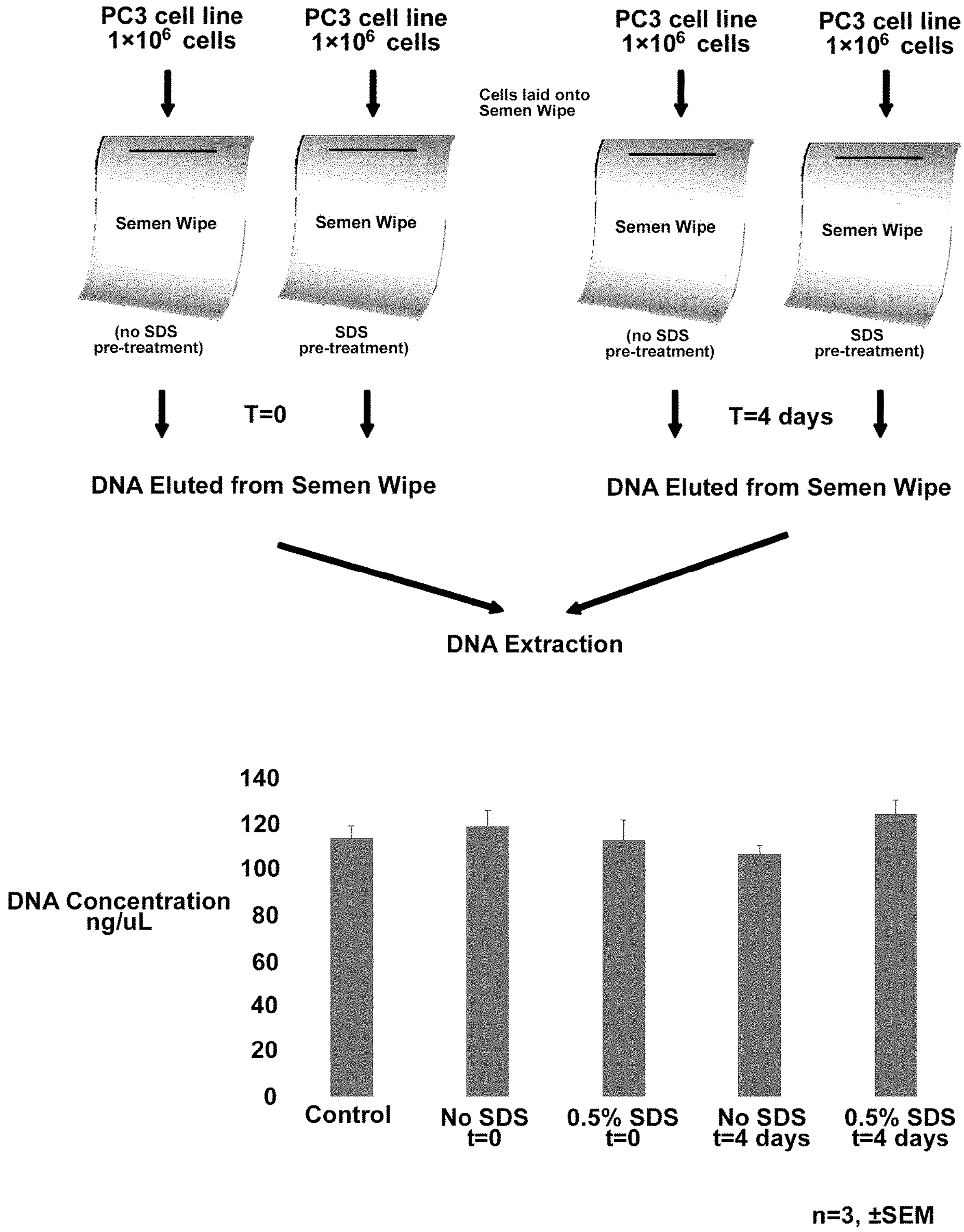
FIG. 3 shows pictorially the amount of DNA recovered with various types of Semen Wipes. Pre-treatment of the Semen Wipe with SDS leads to high recovery of DNA after prostate cancer cells were deposited onto the Semen Wipe.

FIG. 3 shows the effectiveness of DNA recovery from the semen wipe when prostate cancer cells (PC3 cell line) are deposited directly onto versions of the Semen Wipe. The Semen Wipe is either pre-treated with SDS or nothing and DNA recovery was attempted immediately after the cancer cells were deposited onto the semen wipe or 4 days after cancer cell deposition. After DNA was eluted and extracted from the Semen Wipes, spectrophotometry was performed to quantitate DNA yields. In all groups regardless of pre-treatment, a high amount of DNA was recovered. This indicates that the semen wipe is able to collect cellular DNA and is amenable for recovery for subsequent DNA mutation analysis.

Figure 4:
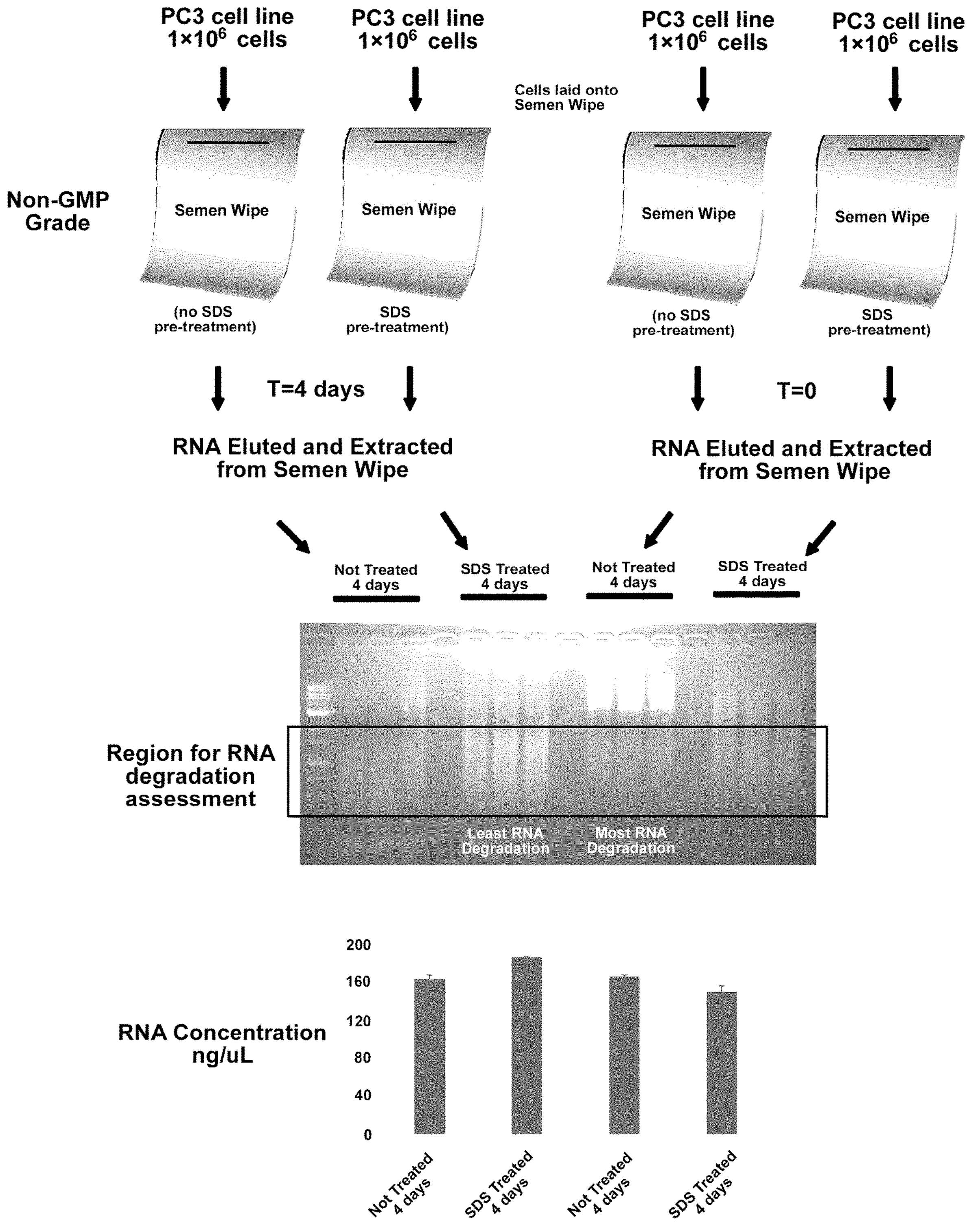
FIG. 4 shows pictorially the amount of RNA recovered with various types of Semen Wipes that were not autoclaved but pre-treated with SDS. Sterilization of the Semen Wipe by autoclaving or any other sterilization method is critical since the majority of RNA was observed to be mostly degraded in all wipes but some preservation was observed with wipes pre-treated with SDS.

FIG. 4 shows the effectiveness of RNA recovery from the semen wipe when prostate cancer cells (PC3 cell line, $1\times10^6$ cells deposited to each wipe) are deposited directly onto various forms of the semen wipe. These semen wipes were not autoclaved (not sterile) and pre-treated with SDS or nothing. RNA recovery was attempted immediately after the cancer cells were deposited onto the semen wipe or 4 days after cancer cell deposition. The highest amount of RNA recovered was observed in the Semen Wipe pre-treated with SDS and extracted at 4 days post-deposition of cancer cells. The lowest amount of RNA recovered was when Semen Wipes were not pre-treated. However, the majority of RNA was degraded in all semen wipes because the semen wipes were not sterilized by autoclaving before pre-treatment with SDS.

Figure 5:
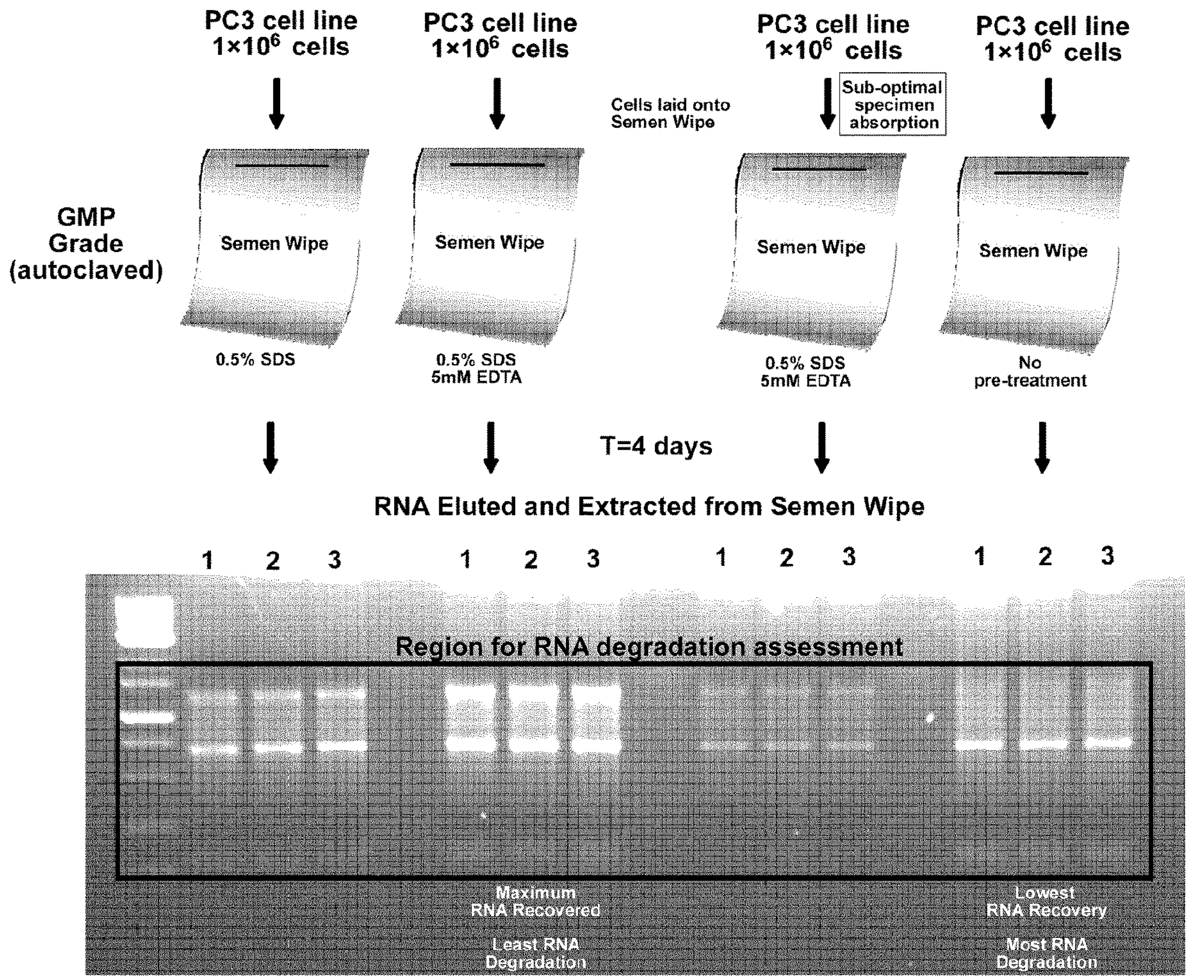
FIG. 5 shows pictorially that sterilized Semen Wipes pretreated with SDS and EDTA lead to the highest rates of RNA recovery when using prostate cancer cells as the specimen collected by the semen wipe.

FIG. 5 shows the impact of sterilizing the Semen Wipes alongside pre-treatment with SDS and another RNA stabilizing agent, EDTA, on RNA recovery from cell-based specimens collected by the Semen Wipe. Prostate cancer cells were deposited onto the Semen Wipes (PC3 cells, $1\times10^6$ cells/wipe) except for one group in which the wipe was applied to a dish of prostate cancer cells, leading to sub-optimal absorption of cells. This was performed to assess the Semen Wipe's ability to soak up cancer cells in culture media. RNA was eluted and extracted from the Semen Wipes at T=4 days. Gel electrophoresis revealed that Semen Wipes pre-treated with SDS or SDS+EDTA had the highest recovery of RNA with intense bands representing 28S RNA and 18S RNA. Semen Wipes that were not treated had the lowest amount of RNA recovered. The Semen Wipes that had suboptimal absorption of cancer cells also yielded low levels of RNA recovered.

Figure 6:
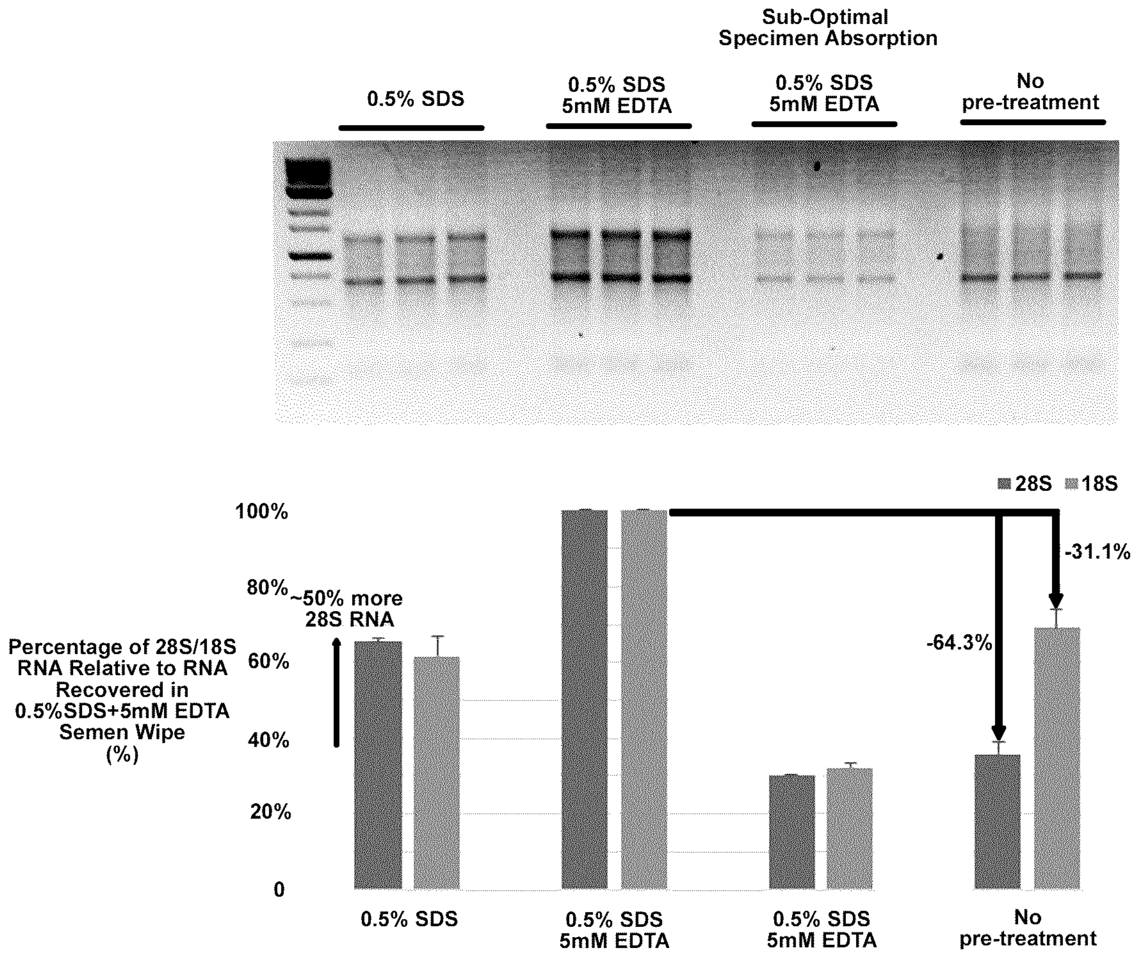
FIG. 6 shows pictorially how the semen wipe with SDS and EDTA pre-treatment inhibits RNA degradation, specifically at larger sizes (28S RNA). The use of SDS and EDTA leads to 50% more 28S RNA being recovered compared to no pre-treatment.

FIG. 6 shows how SDS and EDTA pre-treated semen wipes results in the greatest preservation of large RNA species, such as the 28S RNA species, compared to non-treated semen wipes. Using the same samples as shown in FIG. 5, There is 64.3% less 28S RNA in the non-treated semen wipe compared to the SDS+EDTA pre-treated semen wipe. The use of SDS alone in the semen wipe leads to ~50% more 28S RNA being recovered compared to the non-treated semen wipe.

Figure 7:
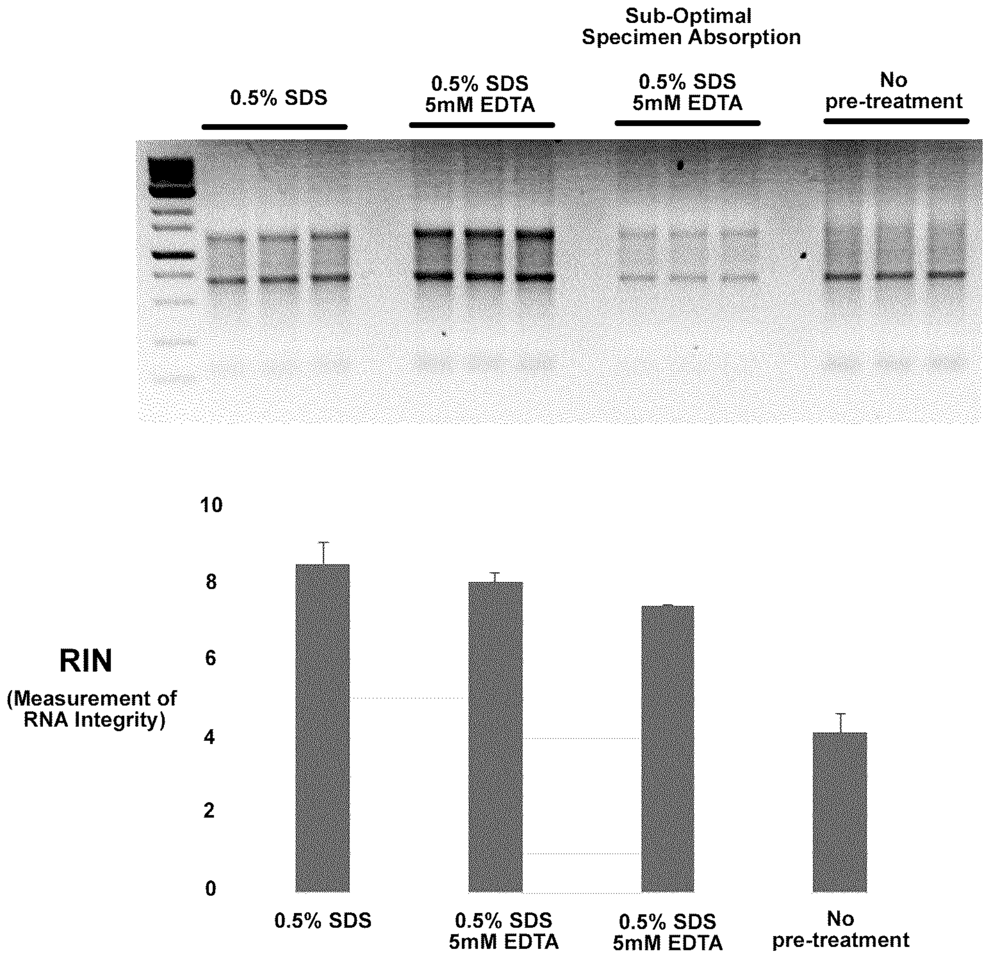
FIG. 7 shows pictorially that sterilized semen wipes pre-treated with SDS and EDTA lead to minimal RNA degradation as determined by RIN (RNA Integrity Number) when using prostate cancer cells as the specimen collected by the semen wipe.

FIG. 7 shows how the semen wipe with SDS and EDTA pre-treatment inhibits RNA degradation, specifically at larger sizes (28S RNA). RNA integrity number (RIN) is calculated as the ratio of the amount of 28S RNA versus the amount of 18S RNA multiplied by 10. When there is an equal amount of 28S versus 18S RNA, then that sample is considered to have excellent RNA yield and minimal RNA degradation. The lower the amount of 28S RNA relative to 18S RNA in sample, then this indicates significant RNA degradation has occurred in the sample prior to electrophoresis gel analysis. RIN number was highest in the semen wipes pre-treated with SDS and EDTA or SDS alone. The lowest RIN number was observed in semen wipes that received no pre-treatment.

Figure 8:
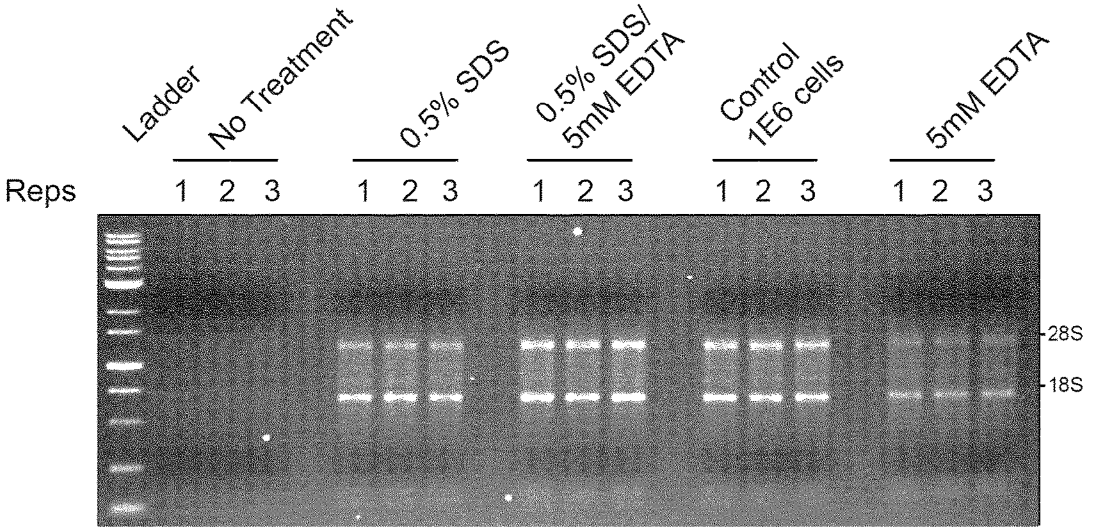
FIG. 8 shows pictorially that the semen wipe pretreated with SDS and EDTA leads to near complete recovery of all the RNA present within PC3 cancer cells when compared to control (1E6 or $1\times10^6$ cell's worth of RNA)
Figure 8:
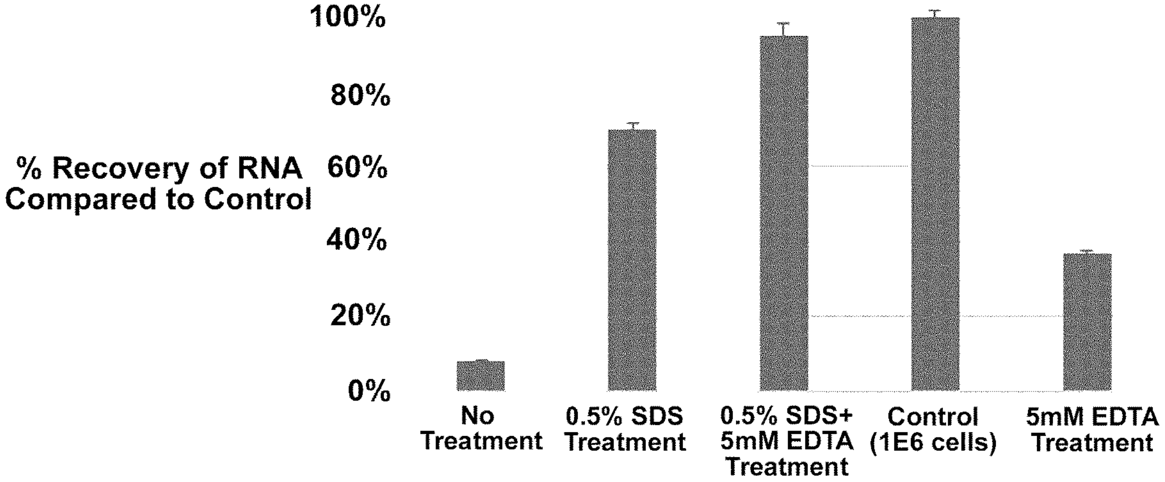

FIG. 8 shows how effective the Semen Wipe is in recovering the RNA from prostate cancer cells that were deposited onto various versions of the Semen Wipe. The Semen Wipes that were sterilized and then pre-treated with SDS and EDTA yielded the same amount of RNA (both 28S and 18S RNA species) as the control sample which was the RNA extracted from $1\times10^6$ PC3 cells (~95% recovery). SDS-only treated Semen Wipes yielded ~70% RNA recovery rates and EDTA-only pre-treated Semen Wipes yielded ~35% RNA recovery rates. Semen Wipes that were not pre-treated yielded very low RNA recovery rates.

Figure 9:
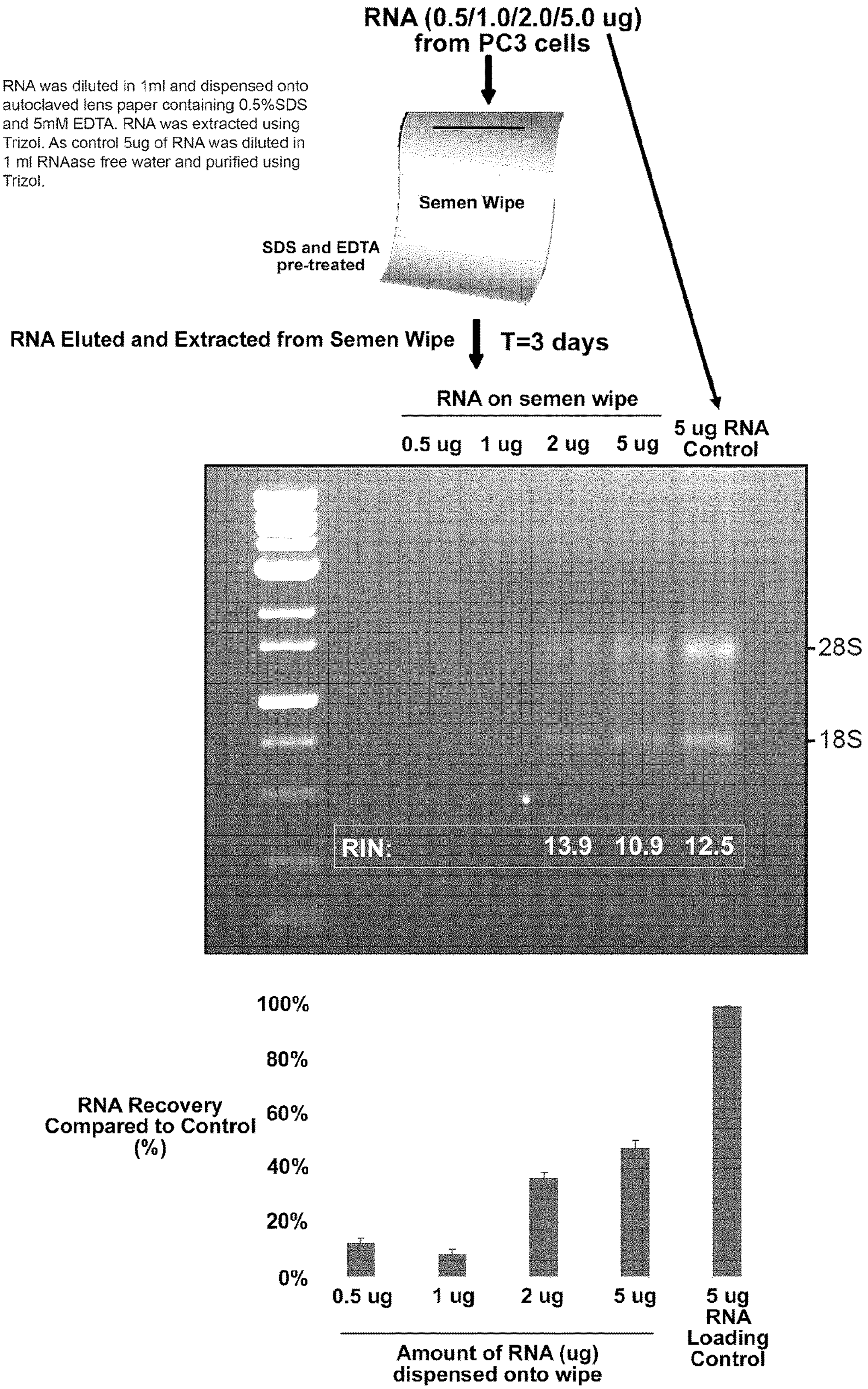
FIG. 9 shows pictorially that the semen wipe pretreated with SDS and EDTA leads to RNA recovery rates of ~40% when using purified RNA previously extracted from PC3 cancer cells. Minimal RNA degradation is also observed (high RIN number).

FIG. 9 shows the effectiveness of SDS+EDTA pre-treatment in the recovery of purified RNA deposited onto the semen wipe. RNA was isolated via Trizol reagent from PC3 cells and then deposited onto the semen wipe at varying amounts (0.5, 1.0, 2.0, 5.0 μg) and then RNA was recovered from the semen wipes at T=3 days. After RNA recovery, the samples were analyzed via gel electrophoresis and compared to 5 μg of the starting material RNA. The RIN values were high for the 2.0 and 5.0 μg recovery semen wipes (>10). The RNA recovery rates compared to loading control (5.0 μg) was 50% and 38% for the 5 μg and 2 μg semen wipe groups respectively. These results show that purified or extracellular RNA species can be adequately recovered via the semen wipe with minimal RNA degradation (RNA>10).

There are several advantages to using semen as the analyte. Firstly, it is the most direct way to determine if there are cancer related biomarkers being released by a prostate cancer tumor. This is because prostate cancer tumors grow into the ducts of the prostate gland that secrete prostatic fluid and in doing so, naturally release or exfoliate various forms of themselves (cells, fragments of cells, vesicles, proteins, RNA/DNA, metabolites, electrolytes) into the prostatic fluid. Therefore, semen is a reservoir of prostate cancer specific biomarkers such as PCA3 and BRCA1/2 (please see next section). Secondly, the self-expression (via masturbation) of semen is non-invasive in comparison to providing blood which requires a hypodermic needle. Thirdly, there are several clinically validated prostate cancer biomarkers known to be present in semen that can be used for diagnosis such as PCA3 lncRNA levels, PSA mRNA levels, and BRCA1/2 DNA mutations (please see next section). Fourthly, the semen sample can be collected in the privacy of the man's home instead of providing the sample at a clinic.

The use of a piece of tissue/lens paper or fabric treated with SDS (or a similarly functioning chemical to inhibit RNAses/DNAses that is skin-friendly) to collect semen after ejaculation also has various advantages. Firstly, deposition of semen onto a dry substrate such as tissue/lens paper immediately dries the sample and prevents further degradation of any biomarkers (protein, RNA/DNA). This is because nucleases such as RNases and DNases need an aqueous environment in order to access and bind to any surrounding RNA/DNA for degradation.

Preserving RNA/DNA in semen is essential since we are looking for levels of two RNA species: PCA3 and PSA as biomarkers for PCa. If all the proteins and RNA/DNA are immobilized to the fibers of the paper then RNA/DNA degradation is significantly inhibited. Secondly, since men generally produce about 0.5 to about 4.0 mL of semen due to ejaculation, the tissue/lens paper treated with SDS can be smaller in size (4"×6") to adsorb the collected semen. This small size of tissue/lens paper treated with SDS can fit into the majority of paper envelopes to be mailed for analysis at a laboratory. Thirdly, since there is SDS on this tissue/lens paper for collection and adsorption of semen, the SDS chemical will inhibit any RNases or DNases in the semen and the surface the semen may be on during adsorption onto the paper (toilet, lubricant, bedsheet, etc.).

This means the patient can safely use the tissue/lens paper with SDS on it or the "Semen Wipe" to safely clean up any or all semen released via ejaculation. Lastly, the use of a tissue/lens paper with SDS or "Semen Wipe" allows for the easy elution or extraction of genetic material from the paper by simply adding an Elution Solution. After elution, steps to perform quantitative PCR for PCA3 lncRNA and PSA mRNA levels can be performed immediately.

The Semen Wipe as an Effective and Non-Invasive Collection Device for Sexually Transmitted Diseases The semen wipe 10 can also be used to screen for sexually transmitted diseases such as Herpes, HIV, *Chlamydia*, Gonorrhea, Trichomoniasis, and Syphilis. This is possible because semen is a reservoir for these diseases and is the vector medium for transmission between partners during semen exchange during intercourse. Hence, the preservatives in the semen wipe 10 make it ideal for collecting semen and wiping the skin of the male or female genitalia for testing. This would significantly make collection and adoption more straightforward compared to other biofluids such as urine and blood prick which are either inaccurate or painful. The detection of these STDs would be performed by qPCR analysis for the genomes of each of these virally transmitted diseases. This means that RNA representing the SARS-COV-2 RNA genome (COVID-19) and other pandemic viruses such as MERS, SARS, Influenza, which are present in semen can also be used as a potential diagnostic or quantitate treatment response in infected patients.

Given the specific preservation requirement, it is highly advantageous to have a compact device for preservation and efficient collection of semen immediately after ejaculation. The collection and preservation mechanism in the present disclosure is in the form or a tissue/lens paper wipe for easy collection of the semen sample off from a patient's skin or off a surface such as a bedsheet, etc. This paper-based structure or device immediately immobilizes all biological material in the semen onto the "Semen Wipe" and is immediately followed by drying of the sample since the liquid within the semen will spread out through the paper-based wipe via adsorption. This drying effect will quickly preserve most biomarker types (except cells such as cancer cells, sperm) since degradation of biomarkers is only possible in an aqueous setting. It will not preserve cells since the paper will also draw out the water in a cell/sperm, thus causing it to be no longer viable. The presence of any combination of RNase/DNase inhibitors impregnated into the wipe preserves any disease biomarkers present in the self-expressed semen.

The "Semen Wipe" disclosed herein is unique and is designed for the collection of semen immediately after ejaculation and immediate preservation of this biological liquid material. It uses a very thin piece of paper (lens/tissue) to act as a wipe in order to efficiently collect the sample from any surface the semen sample may be on (skin of male genitalia, floor, toilet, bedsheet, etc.). The (non-limiting) small size dimensions (4"×6" inches) means that it is compact enough to be sent to the laboratory in most envelopes.

The Semen Wipe provided to the patient contains an agent that inhibits the action of specific enzymes (nucleases) that degrade RNA or DNA, known as RNases and DNases. It can also contain a small amount of sodium azide (up to 0.02% vol.) to prevent any growth of bacteria or mold, etc.

In an embodiment the chemical used to inhibit the nucleases is sodium dodecyl sulfate or SDS (from about 0.1 to about 5.0% vol. in $H_2O$) and this is not toxic or irritating to human skin at this concentration. Other chemicals that are known inhibitors of nucleases can be used instead of SDS as long as they are non-irritants to skin. This would exclude well-known RNase inhibitor solutions such as "RNAlater" which is toxic to skin. The semen wipe paper contains an agent that promotes positive charge on the fibers of the paper. Triboelectification can be performed via friction against other unused Semen Wipes, friction with a glass/plastic rod, or addition of about 1 to about 5 mM EDTA or about 0.1 to about 1.0% polyethylenimine which are both not toxic or a skin-irritant. Chemicals that chelate divalent ions (such as $Ca^{2+}$, $Mg^{2+}$, etc.) are also a key ingredient because these prevent RNA/DNA and protein degradation by blocking enzymatic activity in the semen. Any chelating chemical should be used as long as they are non-irritants to skin.

A quick response (QR code) sticker is placed onto one corner of the wipe that is provided to the patient. This will allow the user to electronically "link" the patient's semen wipe to their chart/profile and allow the patient and the doctors of their choosing to see their test result. This will eliminate any need for any self-identifying information to be included in the used semen wipe when it is sent in the mail. A smartphone app specific to the Semen Wipe technology can be used to scan the QR code which will then electronically "link" the patient's Semen Wipe to their chart/profile. This information regarding the Semen Wipe that has been linked to the user/patient will be sent to the core laboratory electronically.

The core laboratory will be able to confirm that the Semen Wipe will have arrived and determine the tests ordered by the patient/doctor to be performed. This Semen Wipe requisition pathway will improve accuracy of tests performed while also minimizing the amount of patient identifying information used in the entire submission process. This app can also receive information regarding the Semen Wipe (confirmation of receipt, timeframe of Semen Wipe testing, errors, etc.) and send it to the patient/user via the smartphone app. The Semen Wipe specific smartphone app can also be used to help the patient provide payment after the smart phone app scans the QR code, linking that specific Semen Wipe to the patient's ID.

This app can also serve as a communication portal to their family doctor or urologist and also contain a library of material pertaining to prostate cancer screening, treatment options, and multi-media files on various related topics. The app can also provide instructions for how to use the Semen Wipe and how to submit the used Semen Wipe via the post. The Semen Wipe specific app can also be used for clinical trials and to obtain informed consent via electronic format(s) for trials that use the Semen Wipe for analysis.

The chemical agent used to minimize RNA/DNA degradation provided in the wipe to the patient may also be applied to the inner surface of the plastic bag to line the inner bag in which the semen wipe is transported to the lab. This will also help minimize RNA/DNA degradation once the used "semen wipe" is placed in the bag which is then placed in the return envelope to be sent in the mail.

Once the wipe with absorbed and dried semen is received at the lab, all the biological material from the wipe is maximally extracted through the use of proprietary solutions and these are typically comprised of a mix of protease inhibitors and strong acids for analysis of metabolites such as citrate and zinc and magnesium; phenol and strong acids for analysis of RNA/DNA/protein. These elution solutions are used to transfer the semen sample from the wipe into the solution for subsequent analysis such as qPCR or a colorimetric assay (protein, citrate, zinc levels). This proprietary solution would be used at the laboratory that receives the used "semen wipe" specimens.

The present "at-home" kit can be used to replace serum PSA levels for screening of prostate cancer. It can also be used to collect other biofluids such as nasal fluids, sputum, fecal matter, skin/sweat, sacrilimal fluid, wounds, and menstrual blood. It allows the patient to submit biofluids of any type for further analysis which can be sent by post. The envelope containing consent forms, information/brochures/ instructions, the wetnap/drynap, the bag to store the used wetnap/drynap, and a return envelope embodies the entire process of biofluid collection.

SUMMARY

In summary there is provided herein a kit provided to the patient includes a "Semen Wipe" (e.g., tissue paper, filter paper, lens paper, fabric) that is impregnated with a 0.5% SDS solution and 5 mM EDTA or any combination of RNAase/DNAse inhibitors that are also skin-friendly to collect the self-expressed semen. This wetnap/drynap or "Semen Wipe" when used to collect any semen post-ejaculation will be placed into a transparent plastic bag (i.e., ziplock or something stronger) and then sent in the mail to the service facility that will analyze the semen. After exposure of the semen wipe to the semen, the semen will be absorbed and eventually will dry. The RNAse/DNAse inhibitors integrated into the semen wipe provided to the patient will prevent further degradation of the target RNA and DNA sequences. RNA stabilizing reagents such as EDTA that are also co-impregnated into the semen wipe will also prevent further degradation of the target RNA and DNA sequences because it will chelate any divalent ions ($Mg^{2+}$, $Ca^{2+}$, $Zn^{2+}$, etc.) that are essential for RNAse/DNAse activity. Once received at the testing lab, this "Semen Wipe" is placed into a vial containing solution for extraction of RNA, DNA, protein or metabolites. The eluted solution containing the bioanalytes of interest will then be used for RNA/DNA extraction with reagents or kits. The biomarkers to be tested for include PCA3 lncRNA, PSA mRNA (urine PCA3 test); BRCA2/1 DNA mutation analysis; serum T levels; Y-chromosome deletions.

Hence, the semen wipe is an effective kit for the efficient collection and maximal preservation of semen and its bioanalyte constituents, such as target RNA molecules, DNA, chromosomes, protein, protein complexes, glycans, metabolites, bacteria, viruses, and cells; all of which can be present in semen. These biological entities and their levels or mutation status can be used to identify if a patient has a given disease condition or not. The levels of the specific biomarker or mutation status will depend on the biology that is correlated to the levels/mutation of the bioanalyte (RNA, DNA, chromosomes, protein, protein complexes, glycans, metabolites bacteria, viruses, cells). Quantitative analysis of those biomarker levels or mutation will use currently accepted technologies and instrumentation. For example, PCA3 RNA (target RNA or RNA biomarker specific for prostate cancer) quantitation would use digital droplet PCR or real-time PCR instrumentation. Quantitation of protein-based and glycan-based biomarkers would rely on mass spectrometry techniques or ELISA assays or western immunoblot analysis if possible. Identification of any specific DNA mutation (such as BRCA2 for high risk of developing prostate cancer) would rely on instruments and kits that enable next generation sequencing of DNA.

Assessing congenital defects leading to male infertility would be to use karyotyping cytogenetic techniques to identify the presence of a truncated form of the Y-chromosome. To identify if certain bacteria are present, general microbiology techniques such as growing the microbes of interest on various culture media (solid agar with various nutrients) would be of interest. Quantitative PCR/real-time PCR could also be used for detection of various bacteria. The same techniques can also be used to quantitate the presence of viruses (i.e., SARS-COV-2) in semen. The use of quantitative PCR/real-time PCR requires the design of PCR primers which are specific for the gene/RNA sequences of interest.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A kit for collection of biofluids and preservation of any DNA and/or RNA contained in the biofluid, comprising:

a wipe composed of fibers for absorbing a preselected biofluid, the wipe impregnated with one or more skin-friendly chemicals for the preservation of DNA and/or RNA of the biofluid absorbed into the wipe;

a rigid re-sealable tube configured to contain the impregnated wipe therein;

a re-sealable bag;

instructions on how to impregnate the wipe with the pre-selected biofluid and seal it in the re-sealable bag; and return envelope configured to receive therein the re-sealable bag containing the impregnated wipe, wherein the re-sealable tube is sealed in the re-sealable bag, and wherein the wipe comprises a slit along one edge of the wipe sized to be trapped between a lid on the rigid re-sealable tube and the tube itself during a procedure of DNA/RNA extraction from the absorbed biofluid so the wipe is draped over a lip of the tube and hangs down into the interior of the tube with a bottom edge of the wipe spaced from the bottom of the tube.

2. The kit according to claim 1, wherein the wipe containing fibers is any one of fiber containing paper and fiber containing fabric.

3. The kit according to claim 1, wherein the wipe comprises a machine-readable code sticker attached thereto for associating the wipe with a patient being screened/tested and for protecting patient privacy during a mailing and analysis process.

4. The kit according to claim 1, wherein the biofluid to be collected is semen.

5. The kit according to claim 1, wherein the impregnated wipe is further impregnated with an EDTA solution for inhibiting RNAse/DNAse activity and inducing RNA/DNA binding to the fibers of the wipe.

6. The kit according to claim 5, wherein the EDTA solution comprises about 1 mM to about 5 mM EDT.

7. The kit according to claim 1, wherein the impregnated wipe is further impregnated with a compound configured to preserve protein biomarkers and to prevent growth of bacteria and mold.

8. The kit according to claim 7, wherein the compound is sodium azide, the sodium azide being present in solution at a concentration of less than about 0.2%.

9. The kit according to claim 8, wherein the sodium azide is present in solution in a range from about 0.01% to about 0.2%.

10. The kit according to claim 1, wherein the one or more skin-friendly chemicals comprises at least one general nuclease inhibitor.

11. The kit according to claim 10, wherein the at least one general nuclease inhibitor is any one or a combination of RNase inhibitors and DNase inhibitors.

12. The kit according to claim 11, wherein the at least one general nuclease inhibitor comprises any one or a combination of sodium dodecyl sulfate (SDS), polyvinylsulfonic acid, and diethyl pyrocarbonate.

13. The kit according to claim 12, wherein the at least one general nuclease inhibitor comprises SDS, and wherein the SDS is present at a concentration of about 0.01% v/v to about 2% v/v.

14. The kit according to claim 13, wherein the SDS is present in a concentration of about 0.5% v/v.

15. A kit for collection of biofluid from a patient and preservation of any DNA and/or RNA contained in the collected biofluid, comprising:

a wipe composed of fibers for absorbing a preselected biofluid, the wipe being selected from a fiber-containing paper or a fiber-containing fabric;

a rigid re-sealable tube configured to contain the impregnated wipe therein;

a re-sealable bag;

instructions on how to impregnate the wipe with the preselected biofluid and seal it in the re-sealable bag;

a return envelope configured to receive therein the re-sealable bag containing the impregnated wipe, wherein the re-sealable tube is sealed in the re-sealable bag, wherein the wipe has a slit along one edge of the wipe sized to be trapped between a lid on the rigid re-sealable tube and the tube itself during an extraction procedure of DNA/RNA from the collected biofluid so the wipe is draped over a lip of the tube and hangs down into the interior of the tube with a bottom edge of the wipe spaced from the bottom of the tube, and wherein the wipe is impregnated with an SDS solution having a concentration of about 0.01% v/v to about 2% v/v SDS acting as a general nuclease inhibitor for the preservation of the DNA and/or RNA contained in the absorbed biofluid, an EDTA solution having a concentration from about 1 mM to about 5 mM EDTA for inhibiting RNAse/DNAse activity and inducing RNA/DNA binding to the fibers of the wipe, and a sodium azide solution having a concentration of about 0.01% to about 0.2% sodium azide for preserving protein biomarkers and preventing growth of bacteria and mold.

* * * * *